(12) United States Patent
Ohsawa et al.

(10) Patent No.: US 9,941,512 B2
(45) Date of Patent: Apr. 10, 2018

(54) ELECTRODE MATERIAL FOR NON-AQUEOUS ELECTROLYTE SECONDARY BATTERY, AND ELECTRODE FOR NON-AQUEOUS ELECTROLYTE SECONDARY BATTERY AND NON-AQUEOUS ELECTROLYTE SECONDARY BATTERY USING THE SAME

(71) Applicant: NISSAN MOTOR CO., LTD., Yokohama-Shi, Kanagawa (JP)

(72) Inventors: Yasuhiko Ohsawa, Kanagawa (JP); Hideaki Horie, Kanagawa (JP); Hiroshi Akama, Kanagawa (JP); Yuki Kusachi, Kanagawa (JP); Yuta Murakami, Kyoto (JP); Kenichi Kawakita, Kyoto (JP); Yusuke Mizuno, Kyoto (JP); Yasuhiro Tsudo, Kyoto (JP); Yasuhiro Shindo, Kyoto (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 226 days.

(21) Appl. No.: 15/027,990

(22) PCT Filed: Oct. 3, 2014

(86) PCT No.: PCT/JP2014/076596
§ 371 (c)(1),
(2) Date: Apr. 7, 2016

(87) PCT Pub. No.: WO2015/053200
PCT Pub. Date: Apr. 16, 2015

(65) Prior Publication Data
US 2016/0248086 A1    Aug. 25, 2016

(30) Foreign Application Priority Data
Oct. 7, 2013    (JP) .................. 2013-210560

(51) Int. Cl.
*H01M 10/00* (2006.01)
*H01M 4/36* (2006.01)
(Continued)

(52) U.S. Cl.
CPC ......... *H01M 4/366* (2013.01); *H01M 4/0402* (2013.01); *H01M 4/133* (2013.01);
(Continued)

(58) Field of Classification Search
CPC .................................................. H01M 10/00
See application file for complete search history.

(56) References Cited

U.S. PATENT DOCUMENTS

2002/0061449 A1    5/2002    Maruo et al.
2006/0251956 A1    11/2006    Kim et al.
(Continued)

FOREIGN PATENT DOCUMENTS

CN    105359309 A    2/2016
JP    04-342966 A    11/1992
(Continued)

OTHER PUBLICATIONS

Sato Takaya, Banno Kimiyo, Maruo Tatsuya, Nozu Ryutaro, New design for a safe lithium-ion gel polymer battery, Journal of Power Sources, Dec. 1, 2005, vol. 152, p. 264-271.

*Primary Examiner* — Jacob Marks
(74) *Attorney, Agent, or Firm* — Young Basile Hanlon & MacFarlane, P.C.

(57) ABSTRACT

A core-shell-type electrode material is used as an electrode active material layer of a non-aqueous electrolyte secondary battery, the core-shell-type electrode material having a core part including an electrode active material and a shell part in which a conductive material is contained in a base material formed by a gel-forming polymer having a tensile elongation at break of 10% or more in a gel state.

11 Claims, 4 Drawing Sheets

(51) Int. Cl.
  *H01M 4/62* (2006.01)
  *H01M 10/0525* (2010.01)
  *H01M 4/04* (2006.01)
  *H01M 4/133* (2010.01)
  *H01M 4/583* (2010.01)
  *H01M 4/66* (2006.01)
  *H01M 4/139* (2010.01)
  *H01M 4/587* (2010.01)
  *H01M 4/02* (2006.01)

(52) U.S. Cl.
  CPC ........... *H01M 4/139* (2013.01); *H01M 4/583* (2013.01); *H01M 4/621* (2013.01); *H01M 4/622* (2013.01); *H01M 4/625* (2013.01); *H01M 4/668* (2013.01); *H01M 10/0525* (2013.01); *H01M 4/587* (2013.01); *H01M 2004/029* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2007/0059600 A1 | 3/2007 | Kim et al. |
| 2009/0023065 A1 | 1/2009 | Hwang et al. |
| 2013/0330619 A1* | 12/2013 | Archer .................. H01M 4/136 429/213 |
| 2014/0315095 A1 | 10/2014 | Honkawa et al. |
| 2016/0149216 A1 | 5/2016 | Mizuno et al. |

FOREIGN PATENT DOCUMENTS

| | | |
|---|---|---|
| JP | 2003-003078 A | 1/2003 |
| JP | 2007-080827 A | 3/2007 |
| JP | 2008-536286 A | 9/2008 |
| JP | 2009-026760 A | 2/2009 |
| JP | 2010-277959 A | 12/2010 |
| WO | 2013-018687 A1 | 2/2013 |

* cited by examiner

MAGNIFICATION OF 3000

ELECTRODE MATERIAL FOR NON-AQUEOUS ELECTROLYTE SECONDARY BATTERY, AND ELECTRODE FOR NON-AQUEOUS ELECTROLYTE SECONDARY BATTERY AND NON-AQUEOUS ELECTROLYTE SECONDARY BATTERY USING THE SAME

CROSS REFERENCE TO RELATED APPLICATION

The present application is based on Japanese Patent Application No. 2013-210560 filed on Oct. 7, 2013, the entire content of which is herein incorporated by reference.

TECHNICAL FIELD

The present invention relates to an electrode material for a non-aqueous electrolyte secondary battery, and an electrode for a non-aqueous electrolyte secondary battery and a non-aqueous electrolyte secondary battery using the same.

BACKGROUND

Currently, a non-aqueous electrolyte secondary battery including a lithium ion secondary battery, which is used for a mobile device such as a mobile phone, is available as a commercial product. Further, in recent years, it is desired to reduce the amount of carbon dioxide in order to cope with the global warming. As such, a non-aqueous electrolyte secondary battery having small environmental burden has been used not only for a mobile device or the like but also for a power source device of an electric vehicle such as a hybrid vehicle (HEV), an electric vehicle (EV), or a fuel cell vehicle.

The non-aqueous electrolyte secondary battery generally has a configuration in which a positive electrode having a positive electrode active material or the like applied on a current collector and a negative electrode having a negative electrode active material or the like applied on a current collector are connected to each other via an electrolyte layer in which a non-aqueous electrolyte solution or a non-aqueous electrolyte gel is retained within a separator. Charging and discharging reactions of a battery occur by absorption and desorption of ions such as lithium ions on electrode active materials.

Herein, in an active material layer containing an electrode active material, in general, a binder (adhesive) is contained, and electrode active materials are bound to each other and come into close contact with the current collector. Further, a conductive aid is contained as necessary, and thus the conductivity of the active material layer is secured. For example, JP 4-342966 A discloses a technique that, when a negative electrode body formed by having lithium or an alkali metal containing lithium as a main component carried therein is used in a carbonaceous material that is a calcined body of an organic compound, carboxymethyl cellulose and styrene-butadiene rubber are concurrently used as a binder (adhesive) of the negative electrode body. Further, according to the disclosure of JP 4-342966 A, with such a configuration, it is possible to prevent the negative electrode body from coming off or prevent an internal short from occurring, and thus cycle characteristics in charge and discharge can be improved.

SUMMARY

However, as a result of the investigation of the present inventors, it is found that, in the related art in which a component contained in an active material layer is bound by use of a binder as in JP 4-342966 A, the internal resistance of a battery cannot be sufficiently decreased (the internal resistance increases) in some cases.

Under the circumstances, an object of the present invention is to provide a means that can minimize an increase in the internal resistance of a non-aqueous electrolyte secondary battery.

In order to achieve the object described above, according to an aspect of the present invention, there is provided an electrode material for a non-aqueous electrolyte secondary battery, having a core part including an electrode active material and a shell part in which a conductive material is included in a base material formed by a gel-forming polymer having a tensile elongation at break of 10% or more in a gel state.

In addition, according to another aspect of the present invention, there is also provided an agent for inhibiting an increase in internal resistance for a non-aqueous electrolyte secondary battery, in which a conductive material is included in a base material formed by a gel-forming polymer having a tensile elongation at break of 10% or more in a gel state.

DETAILED DESCRIPTION OF THE EMBODIMENTS

Figure 1:
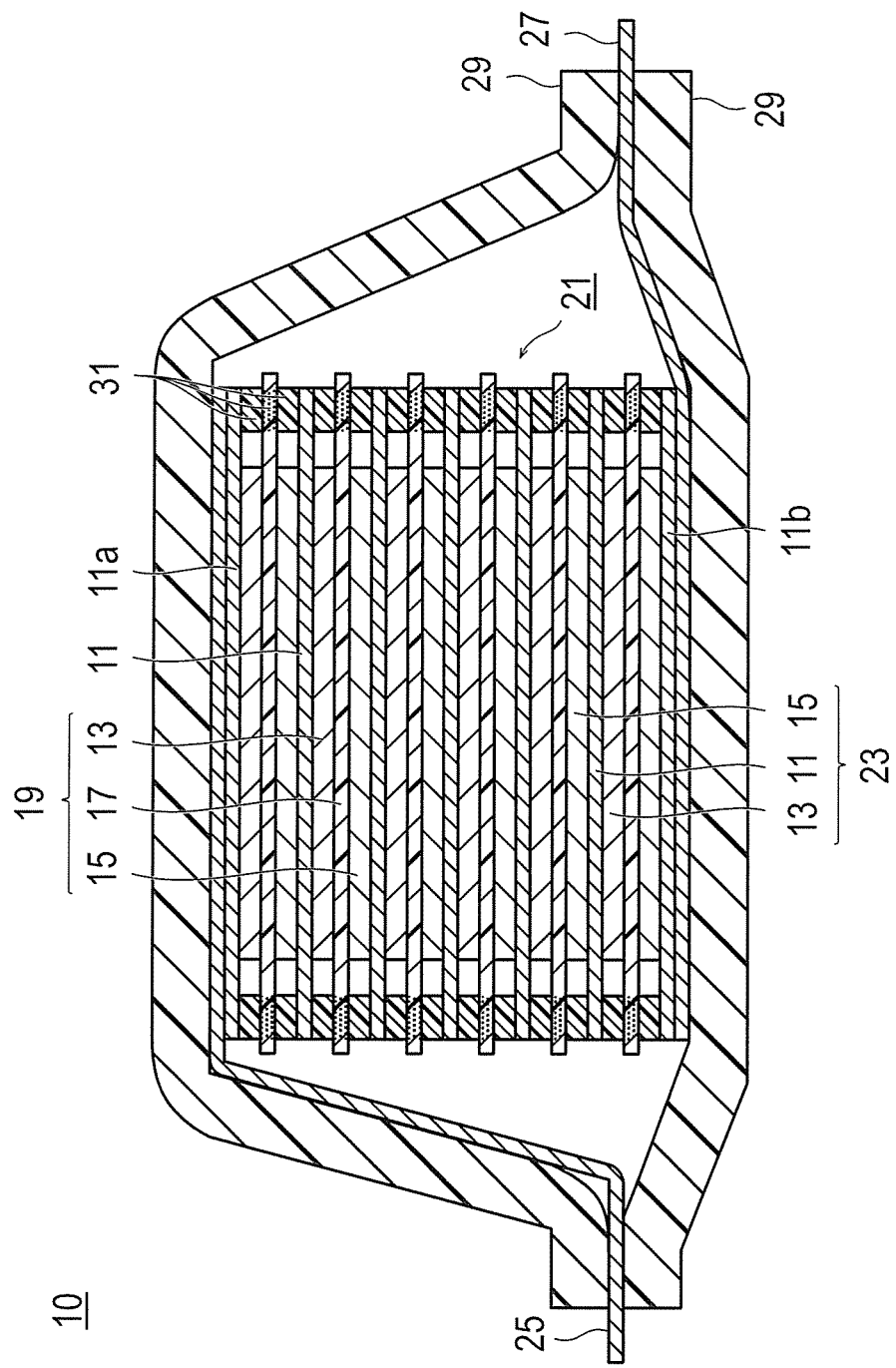
FIG. 1 is a cross-sectional view schematically illustrating a bipolar type secondary battery according to an embodiment of the present invention.

According to an aspect of the present invention, there is provided an electrode material for a non-aqueous electrolyte secondary battery having a core part including an electrode active material, and a shell part in which a conductive material is included in a base material formed by a gel-forming polymer having a tensile elongation at break of 10% or more in a gel state. In addition, according to another aspect of the present invention, there is provided an agent for inhibiting an increase in internal resistance for a non-aqueous electrolyte secondary battery, in which a conductive material is included in a base material formed by a gel-forming polymer having a tensile elongation at break of 10% or more in a gel state. According to the present invention, the shell part including a gel-forming polymer is present on the surface of the electrode active material, and thus the conduction path of lithium ions from the surface of the electrode active material is secured. In addition, the conductive material is included in the gel-forming polymer, and thus the conduction path of electrons from the surface of the electrode active material is also secured. As a result, an increase in the internal resistance of the non-aqueous electrolyte secondary battery can be minimized.

The present inventors conducted intensive studies in view of the problems as described above (providing a means that can minimize an increase in the internal resistance of a non-aqueous electrolyte secondary battery). In the process, the present inventors set a hypothesis that the cause of an increase in the internal resistance of the battery in the related art in which a binder is contained in an active material layer is that an electron conduction network from the electrode active material to the current collector and an ion conduction network toward a counter electrode are not sufficiently secured, which is caused by the surface of an electrode active material being coated with an insulating thin film derived from a binder. In addition, the present inventors tried disposing a shell part formed by a polymer which forms a gel by swelling of a liquid electrolyte (gel-forming polymer) and a conductive material on the surface of the core part formed by an electrode active material, based on a technical idea considerably different from the related art. Then, it has been confirmed that both the conduction paths of lithium ions and electrons on the surface of the electrode active material are secured and a certain effect is obtained for decrease in the internal resistance of the battery by such a countermeasure.

However, it is also found that, when the shell part formed by the gel-forming polymer and the conductive material is simply disposed around the core part (electrode active material), the effect of lowering the internal resistance is limited, and in some cases, the sufficient effect of lowering the internal resistance cannot be obtained. Further, the present inventors further examined the cause thereof, and found that, even when the shell part is formed, the breakage of the shell part is caused by expansion and shrinkage of the electrode active material accompanying charge and discharge of the battery, and as a result, the sufficient effect of lowering the internal resistance cannot be achieved in some cases. Based on these findings, the present inventors tried using a material having a certain level of flexibility as a base material (gel-forming polymer) constituting the shell part. Specifically, they confirmed that it is also possible to follow expansion and shrinkage of the electrode active material so that the shell part is less likely to be broken and the sufficient effect of lowering the internal resistance can be achieved when a gel-forming polymer having a tensile elongation at break of 10% or more in a gel state is used as the gel-forming polymer. Thus, the present invention is completed.

Hereinafter, while referring to the drawings, a description will be made of a preferred embodiment according to the present invention, but the technical scope of the present invention should be determined based on the scope of claims, and is not limited only to the following embodiments. Incidentally, the same reference numerals are assigned to the same elements in the description of the drawings, and duplicate descriptions are omitted. In addition, the scale of the drawings includes some exaggeration for descriptive reasons, and may thus be different from the actual dimension.

In the present specification, in some cases, a bipolar type lithium ion secondary battery is simply referred to as a "bipolar type secondary battery" and a bipolar type lithium ion secondary battery electrode is simply referred to as a "bipolar type electrode."

FIG. 1 is a cross-sectional view schematically illustrating a bipolar type secondary battery according to an embodiment of the present invention. A bipolar type secondary battery 10 illustrated in FIG. 1 has a configuration in which a power generating element 21 with a substantially rectangular shape, in which a charge and discharge reaction actually occurs, is sealed in the inside of a laminate film 29, which is a battery outer casing material.

As illustrated in FIG. 1, the power generating element 21 of the bipolar type secondary battery 10 according to this embodiment includes plural bipolar type electrodes 23 in which a positive electrode active material layer 13 electrically connected to one surface of a current collector 11 and a negative electrode active material layer 15 electrically connected to the other surface of the current collector 11 are formed. The respective bipolar type electrodes 23 are stacked on top of each other via electrolyte layers 17 to form the power generating element 21. Incidentally, the electrolyte layers 17 each have a configuration in which an electrolyte is held in the middle portion in the plane direction of a separator serving as a base material. At this time, the bipolar type electrodes 23 and the electrolyte layers 17 are alternately stacked in such a manner that the positive electrode active material layer 13 of one bipolar type electrode 23 faces the negative electrode active material layer 15 of another bipolar type electrode 23 adjacent to the one bipolar type electrode 23 via the electrolyte layer 17. That is, the electrolyte layer 17 is disposed to be interposed between the positive electrode active material layer 13 of one bipolar type electrode 23 and the negative electrode active material layer 15 of another bipolar type electrode 23 adjacent to the one bipolar type electrode 23.

The positive electrode active material layer 13, the electrolyte layer 17, and the negative electrode active material layer 15, which are adjacent to each other, constitute a single battery layer 19. Therefore, it can also be said that the bipolar type secondary battery 10 has a configuration in which the single battery layers 19 are stacked on top of each other. In addition, a sealing portion (insulating layer) 31 is provided on the periphery of each of the single battery layer 19. By this structure, liquid junction caused by leakage of an electrolyte solution from the electrolyte layer 17 is prevented and the contact between the current collectors 11 adjacent to each other inside the battery or occurrence of a short circuit caused by slight unevenness at the end portion of the single battery layer 19 in the power generating element 21 is prevented. Incidentally, the positive electrode active material layer 13 is formed on only one surface in an outermost layer positive electrode current collector 11a located on the outermost layer of the power generating element 21. Further, the negative electrode active material layer 15 is formed on only one surface in an outermost layer negative electrode current collector 11b located on the outermost layer of the power generating element 21.

Further, in the bipolar type secondary battery 10 illustrated in FIG. 1, a positive electrode current collecting plate 25 is disposed to be adjacent to the outermost layer positive electrode current collector 11a, and extends to be exposed on the outside of the laminate film 29, which is a battery outer casing material. Meanwhile, a negative electrode current collecting plate 27 is disposed to be adjacent to the outermost layer negative electrode current collector 11b and similarly extends to be exposed on the outside of the laminate film 29.

Incidentally, the number of the single battery layer 19 stacked is adjusted depending on a desired voltage. Further, the number of the single battery layer 19 stacked in the bipolar type secondary battery 10 may be minimized as long as sufficient output can be ensured even when the thickness of the battery is made thinner as much as possible. In order to prevent external damage at the time of operation and avoid environmental worsening, the bipolar type secondary battery 10 may also have a structure in which the power generating element 21 is sealed in the laminate film 29, which is a battery outer casing material under reduced pressure, and the positive electrode current collecting plate 25 and the negative electrode current collecting plate 27 are exposed on the outside of the laminate film 29. Incidentally, herein, the embodiment of the present invention has been described by using a bipolar type secondary battery as an example, but the type of a non-aqueous electrolyte battery to which the present invention can be applied is not particularly limited. The present invention can be applied to an arbitrary non-aqueous electrolyte secondary battery of the related art, such as a so-called parallel laminate type battery, in which single battery layers are connected in parallel in a power generating element.

Hereinafter, main constituent elements of the bipolar type secondary battery of this embodiment will be described.

<<Current Collector>>: A current collector serves as a medium for transferring electrons from one side coming into contact with the positive electrode active material layer to the other side coming into contact with the negative electrode active material layer. The material for forming the current collector is not particularly limited, but, for example, a metal or a resin having conductivity may be used.

Specific examples of the metal include aluminum, nickel, iron, stainless steel, titanium, and copper. In addition to them, a clad material of nickel and aluminum, a clad material of copper and aluminum, or a plating material of a combination of those metals may be preferably used. Furthermore, a foil obtained by coating a metal surface with aluminum may be used. Among them, from the viewpoint of electron conductivity, potential for operating a battery, adhesiveness of a negative electrode active material to a current collector by sputtering, or the like, aluminum, stainless steel, copper, and nickel are preferable.

Further, examples of the latter resin having conductivity include a resin in which conductive filler is added to a conductive polymer material or a non-conductive polymer material as necessary. Examples of the conductive polymer material include polyaniline, polypyrrole, polythiophene, polyacetylene, polyparaphenylene, polyphenylene vinylene, polyacrylonitrile, and polyoxadiazole. Such a conductive polymer material has an advantage in simplification of the manufacturing process and lightness of a current collector since the conductive polymer material has sufficient conductivity even if a conductive filler is not added thereto.

Examples of the non-conductive polymer material include polyethylene (PE; high-density polyethylene (HDPE), low-density polyethylene (LDPE), or the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), or polystyrene (PS). Such a non-conductive polymer material may have excellent potential tolerance or solvent tolerance.

A conductive filler may be added to the conductive polymer material or the non-conductive polymer material as necessary. In particular, when a resin serving as a base material of a current collector only includes a non-conductive polymer, the conductive filler is essential to provide the resin with conductivity.

The conductive filler can be used without particular limitation as long as it is a material having conductivity. Examples of a material having excellent conductivity, potential tolerance, or lithium ion insulation include metal and conductive carbon. The metal is not particularly limited, but the metal preferably includes at least one kind of metal selected from the group consisting of Ni, Ti, Al, Cu, Pt, Fe, Cr, Sn, Zn, In, Sb, and K, or an alloy or metal oxide containing these metals. Further, the conductive carbon is not particularly limited. The conductive carbon preferably includes at least one material selected from the group consisting of acetylene black, Vulcan, Black Pearls, carbon nanofiber, Ketjen black, carbon nanotube, carbon nanohorn, carbon nanoballoon, and fullerene.

The amount of the conductive filler added is not particularly limited as long as it can provide the current collector with sufficient conductivity. In general, the amount is about 5 to 35% by mass.

Incidentally, the current collector of this embodiment may be a single-layered structure formed by a single material or a stacked structure in which layers formed by these materials are appropriately combined. From the viewpoint of lightness of the current collector, it is preferable to contain at least a conductive resin layer formed by a resin having conductivity. In addition, from the viewpoint of interrupting the movement of lithium ions between single battery layers, a metal layer may be provided on a portion of the current collector.

<<Negative Electrode Active Material Layer>>: The negative electrode active material layer 15 contains a negative electrode active material. The bipolar type secondary battery 10 according to this embodiment has a feature in the containing form of the negative electrode active material contained in the negative electrode active material layer 15.

Figure 2:
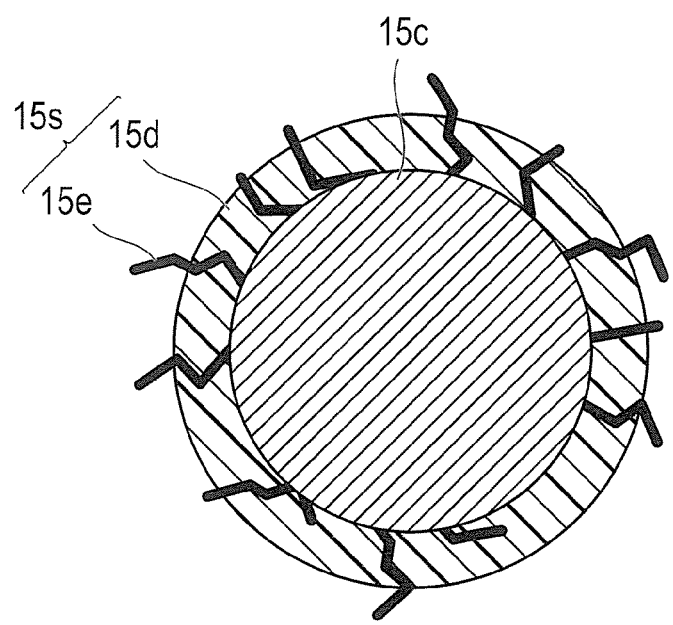
FIG. 2 is a cross-sectional view schematically illustrating an embodiment of a core-shell-type electrode material.

Specifically, in the bipolar type secondary battery 10 according to this embodiment, the negative electrode active material is contained in the negative electrode active material layer 15 in the form of a core-shell-type electrode material (core-shell-type negative electrode material) as illustrated in FIG. 2.

A core-shell-type negative electrode material 15a illustrated in FIG. 2 is configured by a core part 15c including a negative electrode active material and a shell part 15s with which the surface of the core part 15c is coated. Further, this shell part 15s has a configuration in which acetylene black 15e as a conductive material is contained in a base material 15d formed by a predetermined polyethylene glycol-based polyurethane resin. Incidentally, in FIG. 2, the entire surface of the core part 15c is coated with the shell part 15s, but a part of the surface of the core part 15c may be exposed. In a preferred embodiment, 50% by area or more of the surface of the core part 15c is preferably coated with the shell part 15s, more preferably 60% by area or more thereof, further preferably 70% by area or more thereof, particularly preferably 80% by area or more thereof, and most preferably 90% by area or more thereof.

Hereinafter, the details of the core part 15c and the shell part 15s will be described by illustrating, as an example, a case where the core-shell-type electrode material according to the present invention is a negative electrode material. However, as described later, the present invention can be applied as a positive electrode material.

<<Core Part 15c>>: In this embodiment, the core part 15c includes a negative electrode active material. Examples of the negative electrode active material include a carbon material such as graphite (black lead), soft carbon, or hard carbon, a lithium-transition metal composite oxide (for example, $Li_4Ti_5O_{12}$), a metal material, and a lithium alloy-based negative electrode material. If necessary, two or more kinds of a negative electrode active material may be concurrently used. Preferably, from the viewpoint of capacity and output characteristics, a carbon material or a lithium-transition metal composite oxide is used as a negative electrode active material. Incidentally, it is needless to say that a negative electrode active material other than those described above may also be used. Further, a base material (gel-forming polymer) constituting the shell part 15s in the core-shell-type electrode material according to the present invention has a property of easily adhering with respect to particularly a carbon material. For this reason, from the viewpoint of providing an electrode material with a stable structure, it is preferable to use a carbon material as a negative electrode active material in the present invention.

The average particle diameter of the negative electrode active material (in the case of a core-shell-type electrode material, the average particle diameter of the core part) is not particularly limited, but from the viewpoint of higher output power, is preferably 1 to 100 μm, and more preferably 1 to 20 μm.

<<Shell Part 15s>>: In this embodiment, the shell part 15s has a configuration in which a conductive material 15e (here, acetylene black) is included in the base material 15d formed by a predetermined polyethylene glycol-based polyurethane resin as described above. Incidentally, in a case where an electrolyte contained in an electrolyte layer to be described later contains an electrolyte solution (that is, the electrolyte is a liquid electrolyte or a gel electrolyte), an electrolyte solution derived from an electrolyte contained in an electrolyte layer is typically infiltrated in the negative electrode active material layer 15. For this reason, the base material (gel-forming polymer) constituting the shell part 15s absorbs the electrolyte solution to be swollen so that the base material becomes a gel state.

The thickness of the shell part is not particularly limited, but as a thickness of a state in which a gel is not formed, the thickness thereof is preferably 0.01 to 5 μm, and more preferably 0.1 to 2 μm. In addition, as a thickness after the shell part is immersed in an electrolyte solution (1M LiPF$_6$, ethylene carbonate (EC)/diethyl carbonate (DEC)=3/7 (volume ratio)) at 50° C. for 3 days, the thickness thereof is preferably 0.01 to 10 μm, and more preferably 0.1 to 5 μm.

The constitution material of the base material 15d is not limited to the polyethylene glycol-based polyurethane resin, and may be a gel-forming polymer having a tensile elongation at break of 10% or more in a gel state. The term "tensile elongation at break" is an index representing the flexibility of the gel-forming polymer, which is a constitution material of the base material 15d, and is a value obtained by a measurement method described in the section of Examples to be described later. The value of the tensile elongation at break of the gel-forming polymer may be 10% or more, preferably 20% or more, more preferably 30% or more, particularly preferably 40% or more, and most preferably 50% or more. From the viewpoint of solving the problems of the present invention, a larger value of the tensile elongation at break of the gel-forming polymer is preferable.

As a technique of providing flexibility to a gel-forming polymer serving as a constituent material of the base material 15d so as to control the tensile elongation at break to a desired value, a method of introducing a partial structure having flexibility (for example, a long-chain alkyl group, a polyether residue, an alkyl polycarbonate residue, or an alkyl polyester residue) to the main chain of the gel-forming polymer is exemplified. In addition, it is also possible to provide flexibility to a gel-forming polymer so as to adjust the tensile elongation at break by a technique of controlling the molecular weight of the gel-forming polymer or controlling the molecular weight between crosslinks. Particularly, the gel-forming polymer is preferably a polyurethane resin. When the polyurethane resin is used as a gel-forming polymer, which is a constituent material of the base material 15d, first, there is an advantage that a shell part having high flexibility (large tensile elongation at break) is formed. Further, since urethane bonds may form a strong hydrogen bond with each other, it is possible to form a gel-forming polymer having a stable structure while being excellent in flexibility.

When the gel-forming polymer is a polyurethane resin, the specific form thereof is not particularly limited, and reference can be made to the already-known knowledge.

The polyurethane resin is configured by (1) a polyisocyanate component and (2) a polyol component, and may be configured by further using (3) an ionic group-introducing component, (4) an ionic group-neutralizing agent component, and (5) a chain extending agent component, as necessary.

Examples of (1) the polyisocyanate component include diisocyanate compounds having two isocyanate groups in one molecule, and polyisocyanate compounds having three or more isocyanate groups in one molecule, and these may be used alone or in combination of two or more kinds thereof.

Examples of the diisocyanate compounds include aromatic diisocyanates such as 4,4'-diphenylmethane diisocyanate (MDI), 2,4- and/or 2,6-tolylene diisocyanate, p-phenylenediisocyanate, xylylene diisocyanate, 1,5-naphthalene diisocyanate, 3,3'-dimethyldiphenyl-4,4'-diisocyanate, dianisidine diisocyanate, and tetramethylxylylene diisocyanate; alicyclic diisocyanates such as isophorone diisocyanate, dicyclohexylmethane-4,4'-diisocyanate, trans-1,4-cyclohexyl diisocyanate, and norbornene diisocyanate; and aliphatic diisocyanates such as 1,6-hexamethylene diisocyanate, 2,2,4 and/or (2,4,4)-trimethylhexamethylene diisocyanate, and lysine diisocyanate.

These diisocyanate compounds may be used in the form of a modified body such as carbodiimide-modified, isocyanurate-modified, or biuret-modified, and also may be used in the form of a block isocyanate blocked with various blocking agents.

Examples of the polyisocyanate compound having three or more isocyanate groups in one molecule include isocyanurate trimers, biuret trimers, and trimethylolpropane adducts of the diisocyanate provided above as examples; and trifunctional or more isocyanate such as triphenylmethane triisocyanate, 1-methylbenzole-2,4,6-triisocyanate, or dimethyl triphenylmethane tetraisocyanate. These isocyanate compounds may be used in the form of a modified body such as carbodiimide-modified, isocyanurate-modified, or biuret-modified, and also may be used in the form of a block isocyanate blocked with various blocking agents.

Examples of (2) the polyol component include diol compounds having two hydroxyl groups in one molecule and polyol compounds having three or more hydroxyl groups in one molecule, and these may be used alone or in combination of two or more kinds thereof.

Examples of the diol compounds and polyol compounds having three or more hydroxyl groups in one molecule include low molecular weight polyols, polyether polyols, polyester polyols, polyester polycarbonate polyols, crystalline or noncrystalline polycarbonate polyols, polybutadiene polyol, and silicone polyol.

Examples of the low molecular weight polyols include aliphatic diols such as ethylene glycol, 1,2-propanediol, 1,3-propanediol, 2-methyl-1,3-propanediol, 2-butyl-2-ethyl- 1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diols such as cyclohexanedimethanol and cyclohexanediol; and trihydric or higher polyols such as trimethylolethane, trimethylolpropane, hexitols, pentitols, glycerol, polyglycerol, pentaerythritol, dipentaerythritol, and tetramethylolpropane.

Examples of the polyether polyols include ethylene oxide adducts such as diethylene glycol, triethylene glycol, tetraethylene glycol, and polyethylene glycol; propylene oxide adducts such as dipropylene glycol, tripropylene glycol, tetrapropylene glycol, and polypropylene glycol; and ethylene oxide and/or propylene oxide adducts of the low molecular weight polyols described above, and polytetramethylene glycol.

The polyester polyols include a polyester polyol obtained by direct esterification and/or transesterification of a polyol such as the low molecular weight polyols provided above as examples with a polycarboxylic acid or its ester-forming derivative such as ester, anhydride, or halide and/or a lactone or a hydroxycarboxylic acid obtained by ring-opening hydrolysis of the lactone in an amount less than the stoichiometric amount of the polyol. Examples of the polycarboxylic acid or its ester-forming derivative include polycarboxylic acids, such as aliphatic dicarboxylic acids such as oxalic acid, malonic acid, succinic acid, glutaric acid, adipic acid, pimeric acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, and dimer acid; aromatic dicarboxylic acids such as phthalic acid, terephthalic acid, isophthalic acid, and naphthalenedicarboxylic acid; alicyclic dicarboxylic acids such as cyclohexanedicarboxylic acid; tricarboxylic acids such as trimellitic acid, trimesic acid, and trimer of castor oil fatty acid; and tetracarboxylic acids such as pyromellitic acid. Examples of the ester-forming derivative include acid anhydrides of these polycarboxylic acids; halides such as chlorides and bromides of the polycarboxylic acids; and lower aliphatic esters such as methyl, ethyl, propyl, isopropyl, butyl, isobutyl, and amyl esters of the polycarboxylic acids. In addition, examples of the lactones include lactones such as γ-caprolactone, δ-caprolactone, ε-caprolactone, dimethyl-ε-caprolactone, δ-valerolactone, γ-valerolactone, and γ-butyrolactone.

Examples of (3) the ionic group-introducing component, which is used as necessary, include substances capable of introducing an anionic group and substances capable of introducing a cationic group. Examples of the substances capable of introducing an anionic group include polyols containing a carboxyl group, such as dimethylolpropionic acid, dimethylolbutanoic acid, dimethylolbutyric acid, and dimethylolvaleric acid, and polyols containing a sulfonic acid group, such as 1,4-butanediol-2-sulfonic acid, and examples of the substances capable of introducing a cationic group include N,N-dialkylalkanolamines, N-alkyl-N,N-dialkanolamines such as N-methyl-N,N-diethanolamine and N-butyl-N,N-diethanolamine, and trialkanolamines.

As (4) the ionic group-neutralizing agent component, which is used as necessary, examples of anionic group neutralizers include tertiary amine compounds such as trialkylamines (such as trimethylamine, triethylamine, and tributylamine), N,N-dialkylalkanolamines (such as N,N-dimethylethanolamine, N,N-dimethyl propanolamine, N,N-dipropylethanolamine, and 1-dimethylamino-2-methyl-2-propanol), N-alkyl-N,N-dialkanolamines, and trialkanolamines (such as triethanolamine); and basic compounds (such as ammonia, trimethylammonium hydroxide, sodium hydroxide, potassium hydroxide, and lithium hydroxide), and examples of cationic group neutralizers include organic carboxylic acids such as formic acid, acetic acid, lactic acid, succinic acid, glutaric acid, and citric acid; organosulfonic acids such as paratoluene sulfonic acid and alkyl sulfonates; inorganic acids such as hydrochloric acid, phosphoric acid, nitric acid, and sulfonic acid; epoxy compounds such as epihalohydrin; and quaternizing agents such as dialkyl sulfates and alkyl halides.

As (5) the chain extending agent component which is used as necessary, one or two or more kinds of commonly known chain extending agents can be used, and polyamine compounds, polyhydric primary alcohol compounds, and the like are preferable, and polyamine compounds are more preferable. Examples of the polyamine compounds include low molecular weight diamines resulting from the substitution of an alcoholic hydroxyl group in the low molecular weight diols provided as examples with an amino group, such as ethylenediamine and propylenediamine; polyetherdiamines such as polyoxypropylenediamine and polyoxyethylenediamine; alicyclic diamines such as menthenediamine, isophoronediamine, norbornenediamine, bis(4-amino-3-methyldicyclohexyl)methane, diaminodicyclohexylmethane, bis(aminomethyl)cyclohexane, and 3,9-bis(3-aminopropyl)2,4,8,10-tetraoxaspiro (5,5)undecane; aromatic diamines such as m-xylenediamine, α-(m/p aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, and α,α'-bis(4-aminophenyl)-p-diisopropylbenzene; hydrazine; and dicarboxylic acid dihydrazide compounds, which are compounds formed of hydrazine and dicarboxylic acids provided as examples of the polycarboxylic acid to be used for the above-described polyester polyols.

Among the respective components described above, as (1) the polyisocyanate component, a diisocyanate compound is preferably used, 4,4'-diphenylmethane diisocyanate (MDI), 2,4'-diphenylmethane diisocyanate, 4,4'-dicyclohexylmethanediisocyanate, 1,4-cyclohexanediisocyanate, 2,4-toluene diisocyanate, 1,6-hexamethylene diisocyanate, or the like is particularly preferably used, and 4,4'-diphenylmethane diisocyanate (MDI) is most preferably used. In addition, as (2) the polyol component, it is preferable that ethylene oxide adducts, which are diol compounds, be necessarily used, and it is particularly preferable that polyethylene glycol be necessarily used. Since polyethylene glycol is excellent in lithium ion conductivity, with such a configuration, the effect of lowering (inhibiting an increase in) the internal resistance of the battery may be significantly exhibited. Herein, the number average molecular weight of polyethylene glycol as calculated from a hydroxyl value is not particularly limited, but is preferably 2,500 to 15,000, more preferably 3,000 to 13,000, and further preferably 3,500 to 10,000. From the viewpoint of having excellent heat resistance, in addition to the essential components described above, it is preferable to further use ethylene glycol and/or glycerol as a polyol component. In particular, when only ethylene glycol is concurrently used without using glycerol, a gel obtained by swelling of a gel-forming polymer becomes a physically cross-linked gel, and thus a solvent can be dissolved at the time of production. Further, various producing methods as described later can be used. On the other hand, when glycerol is also concurrently used in addition to ethylene glycol, the main chains of a polyurethane resin are chemically cross-linked to each other. In this case, there is an advantage that the swelling degree to an electrolyte solution can be arbitrarily controlled by controlling the molecular weight between crosslinks.

Incidentally, the synthesis method of a polyurethane resin is not particularly limited, and reference can be made to the already-known knowledge.

In the above description, as a preferred embodiment of the invention according to this embodiment, a case where the gel-forming polymer is a polyurethane resin has been described in detail, but it is needless to say that the configuration of the gel-forming polymer is not limited thereto. For example, a copolymer of polyvinylidene fluoride and hexafluoropropylene (PVdF-HFP), polyacrylonitrile (PAN), or the like is used as a gel-forming polymer, similarly. Further, even in a case where these resins are used, it is possible to adjust a tensile elongation at break by providing flexibility to a polymer by using a technique of controlling the molecular weight of the gel-forming polymer, designing a molecular structure, or the like as described above.

In the shell part 15s, the specific type or the containing form of the conductive material 15e in the base material is not particularly limited, but it is sufficient that a conduction path between the core part 15c and the surface of the electrode material (the surface of the shell part 15s) can be formed. Examples of the type of the conductive material 15e include carbon black such as Ketjen black or acetylene black; carbon materials such as graphite and carbon fiber (for example, vapor-phase growth carbon fiber (VGCF)); and various kinds of carbon nanotube (CNT). As for the containing form of the conductive material 15e, in a case where the conductive material 15e is acetylene black or a material which may have a filamentous structure such as carbon fiber, as illustrated in FIG. 2, it is preferable that the surface of the electrode active material (the negative electrode active material in FIG. 2) constituting the core part 15c and the surface of the electrode material (the surface of the shell part 15s) be electrically conducted via the conductive material 15e.

The ratio of the content of the base material 15d and the conductive material 15e contained in the shell part 15s is also not particularly limited, but, for example, the content of the conductive material is preferably 2 to 30% by volume, and more preferably 5 to 20% by volume with respect to 100% by volume of the shell part. Although depending on the type of the conductive material, when the content of the conductive material is 2% by volume or more, it is possible to form a sufficient conduction path, which contributes to a decrease (suppression of an increase) in the internal resistance of the battery. On the other hand, when the content of the conductive material is 30% by volume or less, a change in the material of a base is small, which is preferable. Incidentally, a value of the ratio of the content thereof is calculated as an average value of values obtained by measuring 50 or more of core-shell-type electrode active materials.

As described above, according to the non-aqueous electrolyte secondary battery related to this embodiment, the surface of the core part 15c is coated with the shell part 15s, and thus the effect of lowering (inhibiting an increase in) the internal resistance of the battery is obtained. Therefore, according to another aspect of the present invention, there is provided an agent for inhibiting an increase in internal resistance for a non-aqueous electrolyte secondary battery, in which a conductive material is included in a base material formed by a gel-forming polymer having a tensile elongation at break of 10% or more in a gel state. In addition, according to still another aspect, there is also provided a method for inhibiting an increase in the internal resistance of a non-aqueous electrolyte secondary battery by using the agent for inhibiting an increase in internal resistance. The subject matters according to these aspects can be carried out by referring to the disclosure regarding the subject matters of the electrode material and the non-aqueous electrolyte secondary battery according to the aforementioned embodiments.

<<Method for Producing Core-Shell-Type Electrode Material>>: The method for producing a core-shell-type electrode material is not particularly limited, but any techniques may be preferably used as long as the method includes a coating step of coating a core part including an electrode active material with a shell part in which a conductive material is included in a base material formed by a gel-forming polymer having a tensile elongation at break of 10% or more in a gel state. For example, the following three techniques are exemplified.

(1) Poor Solvent Precipitation Method (Referring to Section of Examples to be described Later): In this method, first, a gel-forming polymer as a base material constituting the shell part 15s is dissolved in a good solvent (in a case where the gel-forming polymer is the polyurethane resin described above, for example, N,N-dimethylformamide (DMF)). Next, powder of an electrode active material is dispersed in the solution, and a poor solvent of the gel-forming polymer (in a case where the gel-forming polymer is the polyurethane resin described above, for example, isopropanol (IPA)) is added to the solution. In this method, the gel-forming polymer is precipitated on the surface of the electrode active material based on the amount of the poor solvent added and the coating of the electrode active material with the gel-forming polymer is achieved. As necessary, the addition of the poor solvent may be separately performed in plural times, or the poor solvent can also be contained in the original solution. At this time, when a conductive material is dispersed in a poor solvent to be added at any time of addition of the poor solvent, the conductive material can be contained in advance in the gel-forming polymer to be precipitated, and thus a core-shell-type electrode material as illustrated in FIG. 2 can be obtained. Incidentally, the above-described operation may be repeated in such a manner that the solid content is filtered by a technique such as filtration under reduced pressure after a predetermined amount of the shell part is formed, and then the filtered solid content is dissolved in the above-described good solvent. At this time, the distribution of the conductive material in the shell part 15s can also be controlled to have a desired form by differentiating the amount (concentration) of the conductive material to be contained in the gel-forming polymer to be precipitated.

(2) Sugar Coating Method (Simple Spray Drying Method): In this method, first, a solution is prepared by dissolving a conductive material and a gel-forming polymer in a good solvent of the gel-forming polymer. Next, the obtained solution is sprayed on the surface of an electrode active material, and then, as necessary, drying treatment is carried out under stirring. Thus, it is possible to obtain a core-shell-type electrode material as illustrated in FIG. 2 by means of the simple technique.

(3) Solid Grinding Method: In this method, a solution is prepared by dissolving an electrode active material, a conductive material, and a gel-forming polymer in a good solvent of the gel-forming polymer. Next, this solution is spread on, for example, a tray, and is dried at a temperature of about 60 to 100° C. so as to evaporate the solvent. In this way, the obtained solid matter is ground to have a desired particle diameter, and, as necessary, screening is carried out. Even in such a technique, it is possible to obtain a core-shell-type electrode material as illustrated in FIG. 2 by means of the simple technique.

Among the above (1) to (3), from the viewpoint of the uniformity of the shell part, the method of (1) described above is preferable. In addition, from the viewpoint of ease of the process, the methods of (2) and (3) described above, which further include a step of preparing a mixture containing the base material (gel-forming polymer) and the conductive material in advance before the coating step of the electrode active material, are preferable.

Hereinbefore, the specific embodiment of the core-shell-type negative electrode material contained in the negative electrode active material layer 15, which is the characteristic configuration in this embodiment, has been described, but the negative electrode active material layer 15 may contain a negative electrode active material other than the aforementioned core-shell-type negative electrode material (for example, the same material as in the related art). Further, in addition to the negative electrode active material (including the core-shell-type negative electrode material), the negative electrode active material layer 15 may contain a binder, a conductive aid, an ion conductive polymer, a lithium salt, or the like.

Examples of the binder include a solvent-based binder such as polyvinylidene fluoride (PVdF), and an aqueous binder.

The electrode active material layer (particularly, the negative electrode active material layer 15) preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced. In addition, when an aqueous binder is used as a binder to be contained in the active material layer in the present invention, water is used as a solvent for preparing an active material slurry which is prepared at the time of coating of the active material layer. However, in this case, even when a core-shell-type electrode material is further added to the active material slurry, the risk that a gel-forming material constituting the electrode material is dissolved in water serving as a preparation solvent is small. For this reason, there are also advantages that it is possible to stably use the electrode material and a gel-forming polymer, which may form a physically cross-linked gel can be used in production of the electrode material.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acryl copolymer, or the like), acrylonitrile-butadiene rubber, methyl methacrylate-butadiene rubber, a (meth)acrylic polymer (polyethylacrylate, polyethylmethacrylate, polypropylacrylate, polymethylmethacrylate (methyl methacrylate rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is preferably 200 to 4000, and more preferably 1000 to 3000, and the saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and salts thereof), polyvinylpyrrolidone, polyacrylic acid (salt), a copolymer of (meth)acrylamide and/or (meth)acrylic acid salt [a (meth)acrylamide polymer, a (meth)acrylamide-(meth)acrylic acid salt copolymer, an alkyl (carbon atom number of 1 to 4) (meth)acrylate-(meth)acrylic acid salt copolymer, or the like], a styrene-maleic acid salt copolymer, a mannich modified product of polyacrylamide, a formalin condensation type resin (a urea-formalin resin, a melamin-formalin resin, or the like), a polyamidepolyamine or dialkylamine-epichlorohydrin copolymer, polyethyleneimine, casein, soybean protein, synthetic protein, and a water soluble polymer such as galactomannan derivatives. These aqueous binders may be used alone or in combination of two or more kinds thereof.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Moreover, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and salts thereof), polyvinylpyrrolidone, polyacrylic acid (salt), and polyethylene glycol. Among them, styrene-butadiene rubber and carboxymethyl cellulose (salt) are preferably combined as a binder. The weight content ratio of the styrene-butadiene rubber to the water soluble polymer is not particularly limited, but the styrene-butadiene rubber:the water soluble polymer is preferably 1:0.1 to 10, and more preferably 1:0.5 to 2.

In a binder used for the negative electrode active material layer, the content of the aqueous binder is preferably 80 to 100% by weight, preferably 90 to 100% by weight, and preferably 100% by weight.

The conductive aid means an additive which is blended in order to enhance the conductivity of the electrode active material layer. Examples of the conductive aid include carbon materials such as carbon black including Ketjen black, acetylene black, and the like, graphite, and carbon fiber. When the active material layer contains a conductive aid, an electron network in the inside of the active material layer is effectively formed, and it can contribute to improvement of the output characteristics of a battery.

Examples of the ion conductive polymer include polyethylene oxide (PEO)-based and polypropylene oxide (PPO)-based polymers.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

A blending ratio of the components that are contained in the negative electrode active material layer 15 and the positive electrode active material layer 13 to be described later is not particularly limited. The blending ratio can be adjusted by suitably referring to the already-known knowledge about a lithium ion secondary battery. Also, the thickness of each active material layer is not particularly limited, and reference can be made to the already-known knowledge about a battery. For example, the thickness of each active material layer is about 2 to 100 μm.

<<Positive Electrode Active Material Layer>>: The positive electrode active material layer 13 contains a positive electrode active material. Further, the positive electrode active material layer 13 may contain a binder, a conductive aid, an ion conductive polymer, a lithium salt, or the like in addition to the positive electrode active material. Since the details of the positive electrode active material are basically the same as the details described in the section of "Negative Electrode Active Material Layer" except the type of the positive electrode active material, description thereof will be omitted. In other words, in the descriptions referring to FIG. 1 and FIG. 2, a case where the negative electrode active material layer 15 contains a core-shell-type electrode material (negative electrode material) has been described as an example, but the present invention can also be applied to the positive electrode. That is, the positive electrode active material contained in the positive electrode active material layer 13 may be a core-shell-type electrode material (positive electrode material) according to the present invention.

Examples of the positive electrode active material include $LiMn_2O_4$, $LiCoO_2$, $LiNiO_2$, $Li(Ni-Mn-Co)O_2$, and a lithium-transition metal composite oxide, such as a compound in which a part of these transition metals is replaced with another element, a lithium-transition metal phosphate compound, and a lithium-transition metal sulfate compound. In some cases, two or more kinds of the positive electrode active material may be concurrently used. From the viewpoint of capacity and output characteristics, a lithium-transition metal composite oxide is preferably used as a positive electrode active material. A composite oxide containing lithium and nickel is more preferably used, and $Li(Ni-Mn-Co)O2$ and a composite oxide in which a part of these transition metals is replaced with another element (hereinafter, simply referred to as "NMC composite oxide") are further preferably used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M, and extractable Li amount is twice the amount of spinel lithium manganese oxide, that is, as the supply power is two times higher, it can have high capacity.

As described above, the NMC composite oxide includes a composite oxide in which a part of transition metal element is replaced with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1). Incidentally, the composition of each element can be measured by induction coupled plasma (ICP) spectroscopy.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice. From the viewpoint of the cycle characteristics, it is preferable that a part of transition element be replaced by another metal element, and particularly, it is preferable that $0 < x \leq 0.3$ in General Formula (1). It is considered that the crystal structure is stabilized by dissolving at least one selected from the group consisting of Ti, Zr, Nb, W, P, Al, Mg, V, Ca, Sr, and Cr so that a decrease in capacity of a battery can be prevented even when charge and discharge are repeated, and thus excellent cycle characteristics can be realized.

As a more preferred embodiment, from the viewpoint of improving a balance between capacity and lifetime characteristics, it is preferable that b, c, and d in General Formula (1) be $0.49 \leq b \leq 0.51$, $0.29 \leq c \leq 0.31$, and $0.19 \leq d \leq 0.21$. For example, as compared with $LiCoO_2$, $LiMn_2O_4$, $LiNi_{1/3}Mn_{1/3}Co_{1/3}O_2$, and the like that exhibit actual performance in a general consumer use battery, $LiNi_{0.5}Mn_{0.3}Co_{0.2}O_2$ has a large capacity per unit weight and, thus has an advantage that a compact battery having a high capacity can be produced since the energy density can be improved. In addition, from the viewpoint of a cruising distance, $LiNi_{0.5}Mn_{0.3}Co_{0.2}O_2$ is preferable. Incidentally, in terms of having a larger capacity, $LiNi_{0.8}Co_{0.1}Al_{0.1}O_2$ is more advantageous, but has a problem in lifetime characteristics. On the other hand, $LiNi_{0.5}Mn_{0.3}Co_{0.2}O_2$ has lifetime characteristics as excellent as $LiNi_{1/3}Mn_{1/3}Co_{1/3}O_2$.

Incidentally, it is needless to say that a positive electrode active material other than the aforementioned positive electrode active material may be used. In addition, the average particle diameter of the positive electrode active material contained in the positive electrode active material layer (in the case of a core-shell-type electrode material, the average particle diameter of the core part) is not particularly limited, but from the viewpoint of having higher output power, the average particle diameter is preferably 1 to 100 μm, and more preferably 1 to 20 μm.

<<Electrolyte Layer>>: The electrolyte to be used in the electrolyte layer 17 of this embodiment is not particularly limited, and a liquid electrolyte, a gel polymer electrolyte, or an ionic liquid electrolyte is used without limitation. When these electrolytes are used, high lithium ion conductivity can be secured.

The liquid electrolyte has a function as a lithium ion carrier. The liquid electrolyte constituting an electrolyte solution layer has the form in which lithium salt is dissolved in an organic solvent. Examples of the organic solvent which can be used include carbonates such as ethylene carbonate (EC), propylene carbonate (PC), dimethyl carbonate (DMC), diethyl carbonate (DEC), and ethylmethyl carbonate. Further, as a lithium salt, a compound which can be added to an active material layer of an electrode such as $Li(C_2F_5SO_2)_2N$, $LiPF_6$, $LiBF_4$, $LiClO_4$, $LiAsF_6$, or $LiCF_3SO_3$ can be similarly employed. The liquid electrolyte may further contain an additive in addition to the components described above. Specific examples of such a compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. These cyclic carbonate esters may be used alone or in combination of two or more kinds thereof.

The gel polymer electrolyte has a configuration in which the aforementioned liquid electrolyte is injected to a matrix polymer (host polymer) consisting of an ion conductive polymer. Using the gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA), and copolymers thereof.

The matrix polymer of a gel polymer electrolyte can exhibit excellent mechanical strength by forming a cross-linked structure. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

The ionic liquid electrolyte is obtained by dissolving a lithium salt in an ionic liquid. Incidentally, the ionic liquid is a salt composed of cation and anion alone, and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), $(FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion ($(CF_3SO_2)_2N^-$), bis(pentafluoroethylsulfonyl)imide ion ($(C_2F_5SO_2)_2N^-$), $BF_3C_2F_5^-$, tris(trifluoromethanesulfonyl) carbon acid ion ($(CF_3SO_2)_3C^-$), perchlorate ion ($ClO_4^-$), dicyanamide ion ($(CN)_2N^-$), organic sulfuric acid ion, organic sulfonic acid ion, $R^1COO^-$, $HOOCR^1COO^-$, $^-OOCR^1COO^-$, and $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom).

Preferred examples of the ionic liquid include 1-methyl-3-methylimidazolium bis(trifluoromethanesulfonyl)imide, and N-methyl-N-propylpyrrolidinium bis(trifluoromethanesulfonyl)imide. These ionic liquids may be used alone or in combination of two or more kinds thereof.

The lithium salt which is used in the ionic liquid electrolyte is the same lithium salt which is used in the liquid electrolyte described above. Incidentally, the concentration of the lithium salt is preferably 0.1 to 2.0 M, and more preferably 0.8 to 1.2 M.

An additive as described below may be added to the ionic liquid. When an additive is contained, charge/discharge characteristics and cycle characteristics may be further improved at a high rate. Specific examples of the additive include vinylene carbonate, ethylene carbonate, propylene carbonate, γ-butyrolactone, γ-valerolactone, methyl diglyme, sulfolane, trimethylphosphate, triethylphosphate, methoxymethyl ethyl carbonate, and fluorinated ethylene carbonate. These may be used alone or in combination of two or more kinds thereof. The use amount when an additive is used is preferably 0.5 to 10% by mass, and more preferably 0.5 to 5% by mass with respect to the ionic liquid.

In the bipolar type secondary battery of this embodiment, a separator may be used in an electrolyte layer. The separator has a function of holding an electrolyte so as to secure the lithium ion conductivity between a positive electrode and a negative electrode and a function of serving as a partition wall between a positive electrode and a negative electrode. In particular, in a case where a liquid electrolyte or an ionic liquid electrolyte is used as an electrolyte, it is preferable to use a separator.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a single layer or a multilayer. The fine pore diameter of the microporous (microporous membrane) separator is preferably 1 µm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Further, the bulk density of the non-woven separator is not particularly limited as long as sufficient battery characteristics are obtained with an impregnated polymer gel electrolyte. Furthermore, it is sufficient that the thickness of the non-woven separator is the same as that of an electrolyte layer, and the thickness thereof is preferably 5 to 200 µm, and particularly preferably 10 to 100 µm.

Further, as a separator, a separator in which a heat resistant insulating layer is laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, a melting point or a heat softening point of 150° C. or higher, preferably 200° C. or higher, are used. By having a heat resistant insulating layer, internal stress in a separator, which increases under temperature increase, is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Moreover, because of the effect of inhibiting thermal shrinkage and a high level of mechanical strength, the separator is hardly curled during the process of producing a battery.

The inorganic particles in a heat resistant insulating layer contribute to the mechanical strength or the effect of inhibiting thermal shrinkage of the heat resistant insulating layer. The material used as inorganic particles is not particularly limited. Examples thereof include oxides ($SiO_2$, $Al_2O_3$, $ZrO_2$, $TiO_2$), hydroxides, and nitrides of silicon, aluminum, zirconium, and titanium, and a composite thereof. These inorganic particles may be derived from mineral resources such as boehmite, zeolite, apatite, kaolin, mullite, spinel, olivine, and mica, or artificially synthesized. Furthermore, these inorganic particles may be used alone or in combination of two or more kinds thereof. Among them, from the viewpoint of the cost, it is preferable to use silica ($SiO_2$) or alumina ($Al_2O_3$), and it is more preferable to use alumina ($Al_2O_3$).

The weight per unit area of heat resistant particles is not particularly limited, but is preferably 5 to 15 $g/m^2$. When the weight per unit area is within this range, sufficient ion conductivity is obtained and heat resistant strength is maintained, which is preferable.

The binder in a heat resistant insulating layer has a role of attaching inorganic particles to each other or attaching inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used as the binder include compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among these, carboxymethyl cellulose (CMC), methyl acrylate, or polyvinylidene fluoride (PVDF) is preferably used. These compounds may be used alone or in combination of two or more kinds thereof.

The content of the binder in the heat resistant insulating layer is preferably 2 to 20% by weight with respect to 100% by weight of the heat resistant insulating layer. When the content of the binder is 2% by weight or more, the peeling strength between the heat resistant insulating layer and a porous substrate layer can be increased and vibration resistance of a separator can be enhanced. On the other hand, when the content of the binder is 20% by weight or less, a gap between inorganic particles is maintained at an appropriate level so that sufficient lithium ion conductivity can be ensured.

The thermal shrinkage rates of a separator having a heat resistant insulating layer for both MD and TD are 10% or less after maintaining for 1 hour at conditions of 150° C. and 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

<<Positive Electrode Current Collecting Plate and Negative Electrode Current Collecting Plate>>: The material for forming a current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable. Aluminum is particularly preferable. Incidentally, the same material or a different material may be used for the positive electrode current collecting plate 25 and negative electrode current collecting plate 27.

<<Positive Electrode Lead and Negative Electrode Lead>>: Further, although it is not illustrated, the current collector 11 and the current collecting plate (25, 27) may be electrically connected to each other via a positive electrode lead or a negative electrode lead. The same material used for a lithium ion secondary battery of a related art can be also used as a material for forming the positive and negative electrode leads. Incidentally, a portion led from an outer casing is preferably coated with a heat resistant and insulating thermally shrunken tube or the like so that it has no influence on a product (for example, an automobile component, in particular, an electronic device or the like) according to electric leak after contact with peripheral devices or wirings.

<<Sealing Portion>>: The sealing portion (insulation layer) has a function of preventing contact between the current collectors adjacent to each other and preventing a short circuit caused at the end portion of the single battery layer. The material constituting the sealing portion may be any materials as long as it has an insulation property, a sealing property (sealing performance) to prevent the solid electrolyte from coming off and prevent permeation of external moisture, heat resistance under battery operation temperature and the like. Examples of the material include an acrylic resin, a urethane resin, an epoxy resin, a polyethylene resin, a polypropylene resin, a polyimide resin, and rubber (ethylene-propylene-diene rubber: EPDM). Alternatively, an isocyanate adhesive, an acrylic resin adhesive, a cyanoacrylate adhesive, or the like may be used, and a hot-melt adhesive (urethane resin, polyamide resin, polyolefin resin) may also be used. Among these, from the viewpoint of corrosion resistance, chemical resistance, ease of production (film-forming performance), economical efficiency, and the like, a polyethylene resin or a polypropylene resin is preferably used as a constituent material of the insulation layer, and a resin containing an amorphous polypropylene resin as a main component and obtained by copolymerizing ethylene, propylene, and butene is preferably used.

<<Battery Outer Casing Body>>: As a battery outer casing body, an envelope-shaped casing capable of covering a power generating element as illustrated in FIG. 1, in which a laminate film 29 including aluminum is contained, may be used in addition to a known metal can casing. As for the laminate film, a laminate film with a three-layered structure formed by laminating PP, aluminum, and nylon in this order can be used, but is not limited thereto. From the viewpoint of having higher output power and excellent cooling performance, and of being suitably usable for a battery for a large instrument such as an EV or an HEV, a laminate film is desirable. In addition, since the group pressure applied from outside to a power generating element can be easily controlled and thus the thickness of an electrolyte solution layer can be easily controlled to a desired value, an aluminate laminate is more preferred for an outer casing body.

In the bipolar type secondary battery of this embodiment, when a positive electrode active material layer or a negative electrode active material layer is configured by using the above-described sheet-shaped electrode, the stress caused by expansion and shrinkage of an active material is alleviated even when an active material having a large battery capacity is used, and thus the cycle characteristics of the battery can be improved. Therefore, the bipolar type secondary battery of this embodiment is suitably used as a power source for operating an EV or an HEV.

Figure 3:
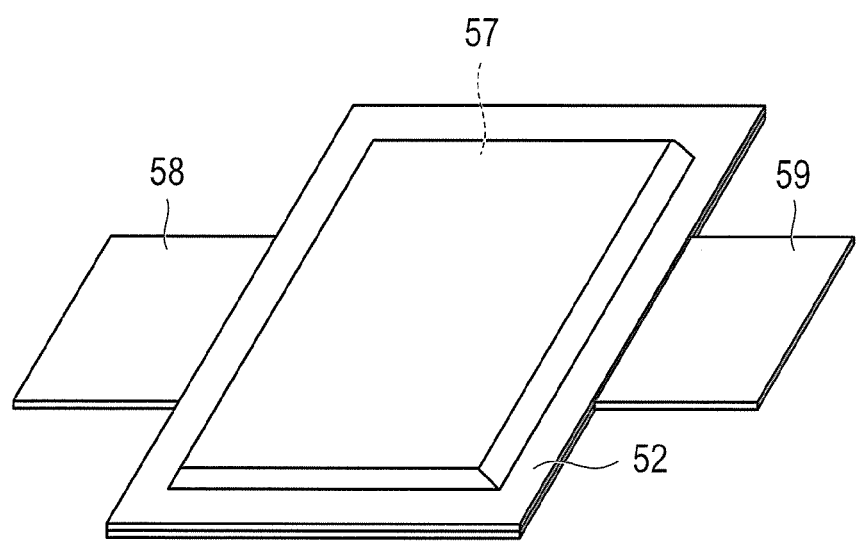
FIG. 3 is a perspective view illustrating the appearance of a flat lithium ion secondary battery as a representative embodiment of a secondary battery.

<<Cell Size>>: FIG. 3 is a perspective view illustrating the appearance of a flat lithium ion secondary battery as a representative embodiment of a secondary battery.

As illustrated in FIG. 3, a flat lithium ion secondary battery 50 has a flat and rectangular shape, and from both sides, a positive electrode tab 58 and a negative electrode tab 59 are drawn to extract electric power. A power generating element 57 is covered by a battery outer casing material (laminate film 52) of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the bipolar type secondary battery 10 illustrated in FIG. 2 as described above. In the power generating element 57, plural single battery layers (single cell) 19, which are each formed of the positive electrode (positive electrode active material layer) 15, the electrolyte layer 17, and the negative electrode (negative electrode active material layer) 13, are laminated.

Incidentally, the lithium ion secondary battery is not limited to a flat shape of laminate type. The winding type lithium ion secondary battery may have a barrel shape or a flat and rectangular shape obtained by modifying the barrel shape, and there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such shape.

Further, drawing of the tabs 58 and 59 illustrated in FIG. 3 is also not particularly limited. The positive electrode tab 58 and the negative electrode tab 59 may be drawn from the same side or each of the positive electrode tab 58 and the negative electrode tab 59 may be divided into plural tabs and drawn from each side, thus there is no particular limitation on the embodiment illustrated in FIG. 3. In addition, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charge and discharge are stored in this space, storage space efficiency of a cell is generally about 50%. The cell loading efficiency for this space is a factor of determining the cruising distance of an electric vehicle. As the size of a single cell decreases, the loading efficiency is lowered, and thus it becomes impossible to maintain the cruising distance.

Therefore, in the present invention, the battery structure of which power generating element is covered with an outer casing body preferably has a large size. Specifically, the length of the short side of a laminate cell battery is preferably 100 mm or more. Such a large-sized battery can be used for an automobile. Herein, the length of the short side of the laminate cell battery indicates the length of the shortest side. The upper limit of the length of the short side is not particularly limited, but is generally 400 mm or less.

<<Volume Energy Density and Rated Discharge Capacity>>: According to the market requirement, a typical electric vehicle needs to have driving distance (cruising distance) of 100 km per single charge. Considering such a cruising distance, the volume energy density of a battery is preferably 157 Wh/L or more, and the rated capacity is preferably 20 Wh or more.

Further, it is also possible to define the large size of a battery in view of a relation of battery area or battery capacity, from the viewpoint of a large-sized battery, which is different from a physical size of an electrode. For example, in the case of a flat and stack type laminate battery, the problem of having lowered battery characteristics (cycle characteristics), which is caused by the collapse of the crystal structure and the like accompanying expansion and shrinkage of an active material, may occur more easily in a battery having a value of a ratio of the battery area (projected area of a battery including a battery outer casing body) to the rated capacity is 5 $cm^2$/Ah or more and having a rated capacity of 3 Ah or more since the battery area per unit capacity is large. Therefore, the non-aqueous electrolyte secondary battery according to this embodiment is preferably a large-sized battery as described above from the viewpoint of having a larger merit obtained from exhibition of the working effects of the present invention. Furthermore, an aspect ratio of a rectangular electrode is preferably 1 to 3, and more preferably 1 to 2. Incidentally, the aspect ratio of the electrode is defined by the longitudinal/transversal ratio of a positive electrode active material layer with a rectangular shape. When the aspect ratio is set to be in such a range, an advantage of having both performances required for a vehicle and loading space can be obtained.

<<Assembled Battery>>: An assembled battery is formed by connecting plural batteries. Specifically, at least two of them are used in series, in parallel, or in series and parallel. According to arrangement in series or parallel, it is possible to freely adjust the capacity and voltage.

It is also possible to form a detachable small-size assembled battery by connecting plural batteries in series or in parallel. Further, by connecting again plural detachable small-size assembled batteries in series or parallel, an assembled battery having high capacity and high output, which is suitable for a power source or an auxiliary power source for operating a vehicle requiring a high volume energy density and a high volume output density, can be formed. The number of the connected batteries for producing an assembled battery or the number of the stacks of a small-size assembled battery for producing an assembled battery with high capacity may be determined depending on the capacity or output of a battery of a vehicle (electric vehicle) on which the battery is mounted.

<<Vehicle>>: The non-aqueous electrolyte secondary battery of the present invention can maintain discharge capacity even when it is used for a long period of time, and thus has good cycle characteristics. Further, the non-aqueous electrolyte secondary battery has a high volume energy density. For use in a vehicle such as an electric vehicle, a hybrid electric vehicle, a fuel cell electric vehicle, or a hybrid fuel cell electric vehicle, a long service life is required as well as high capacity and large size compared to use for an electric and mobile electronic device. Therefore, the non-aqueous electrolyte secondary battery described above can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability and output characteristics, and a long service life can be formed, and thus, by mounting this battery, a plug-in hybrid electric vehicle with a long EV driving distance and an electric vehicle with a long driving distance per charge can be achieved. This is because, when the battery or an assembled battery formed by combining plural batteries is used for, for example, a vehicle such as a hybrid car, a fuel cell electric car, and an electric car (including a two-wheel vehicle (motor bike) or a three-wheel vehicle in addition to all four-wheel vehicles (an automobile, a truck, a commercial vehicle such as a bus, a compact car, or the like)), a vehicle with a long service life and high reliability can be provided. However, the use is not limited to a vehicle, and it can be applied to various power sources of other transportation means, for example, a moving object such as an electric train, and it can be also used as a power source for loading such as an uninterruptable power source device.

Hereinafter, the description is made below in more detail by means of Examples and Comparative Examples, but the present invention is not limited only to the Examples described below.

PRODUCTION EXAMPLE 1

Synthesis of Gel-Forming Polymer (Polyethylene Glycol-Based Polyurethane Resin)

To a four-necked flask equipped with a stirrer and a thermometer, 57.4 parts by mass of polyethylene glycol having a number average molecular weight (as calculated from an OH value) of 6,000, 8.0 parts by mass of ethylene glycol, 34.7 parts by mass of diphenylmethane-4,4'-diisocyanate (MDI), and 233 parts by mass of N,N-dimethylformamide (DMF) were introduced and reacted at 70° C. for 10 hours under a dried nitrogen atmosphere, thereby obtaining a polyurethane resin solution having a resin concentration of 30% by mass and a viscosity of 600 poise (20° C.).

The polyurethane resin solution obtained in this way was cast on a PET film and then dried to form a sheet-shaped film having a thickness of 500 μm, and then the sheet-shaped film was punched in a dumbbell form. Then, after the film was immersed in an electrolyte solution (1M $LiPF_6$, ethylene carbonate (EC)/diethyl carbonate (DEC)=3/7 (volume ratio)) at 50° C. for 3 days, a value of the tensile elongation at break was measured in accordance with ASTM D683 (test piece shape Type II), and as a result, was 50%.

PRODUCTION EXAMPLE 2

Coating of Active Material with Gel-Forming Polymer (Polyethylene Glycol-Based Polyurethane Resin) Containing Acetylene Black (Poor Solvent Precipitation Method)

To a 1 L Erlenmeyer flask, 1.36 parts by mass of the polyurethane resin solution obtained in the Production Example 1 described above (diluted with DMF to be 19.7% by mass of the resin content), 50 parts by mass of DMF, and 50 parts by mass of isopropanol (IPA) were introduced and uniformly stirred. Then, 15 parts by mass of black lead as a negative electrode active material was added thereto, and the resultant mixture was further stirred for 5 minutes. 100 parts by mass of IPA was further added dropwise thereto with a dropping funnel.

After completion of dropwise addition, a solution obtained by dispersing 0.27 part by mass of acetylene black as a conductive material in 40 parts by mass of IPA was added, and the resultant mixture was stirred for 10 minutes. This dispersion liquid was subjected to filtration under reduced pressure, and thus powder was filtered.

Figure 4:
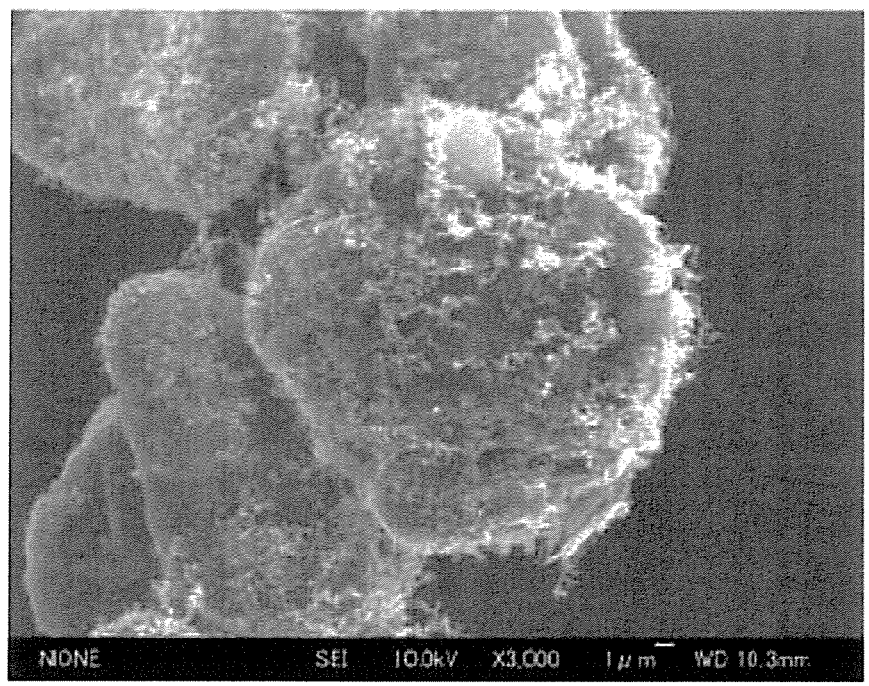
FIG. 4 is a scanning electron microscope (SEM) photograph (magnification of 3000) of a core-shell-type electrode material (negative electrode material) obtained in the Production Example 2 to be described later and FIG. 5 is a graph showing the result obtained by performing alternating current impedance measurement using coin-sized batteries prepared in Examples and Comparative Examples to be described later.

The aforementioned operation from the operation in which 50 parts by mass of DMF and 50 parts by mass of IPA were introduced with respect to the filtered power was repeated three times in total, thereby obtaining a core-shell-type electrode material (negative electrode material) having a core part formed by black lead and a shell part formed by a gel-forming polymer (polyethylene glycol-based polyurethane resin) containing acetylene black. A scanning electron microscope (SEM) photograph (magnification of 3000) of the core-shell-type electrode material (negative electrode material) obtained in this way is shown in FIG. 4.

EXAMPLE 1

Preparation of Test Electrode (Negative Electrode)

92.5 parts by mass of the electrode material (negative electrode material) obtained above, 5 parts by mass of acetylene black as a conductive aid, and 1.25 parts by mass of carboxymethyl cellulose (CMC) as a binder were mixed with one another. Then, water as a solvent for controlling slurry viscosity was added thereto in an appropriate amount, and then was mixed with a stirrer. Thereafter, 1.25 parts by mass of styrene-butadiene rubber (SBR) as a binder was added thereto and then mixed, thereby obtaining a negative electrode active material slurry.

Meanwhile, a copper foil (thickness: 20 μm) was prepared as a negative electrode current collector. Further, the negative electrode active material slurry prepared above was applied to one surface of the negative electrode current collector such that an amount of the active material applied became 10 mg/cm$^2$ to thereby form a coating film. Then, this coating film was dried under vacuum at 80° C. for 60 minutes. Thereafter, the obtained negative electrode was punched using a punch to have a circle shape of φ16 mm, thereby obtaining a test electrode (negative electrode).

EXAMPLE 2

80 parts by mass of the electrode material (negative electrode material) obtained above, 5 parts by mass of acetylene black as a conductive aid, and 7.5 parts by mass of carboxymethyl cellulose (CMC) as a binder were mixed with one another. Then, water as a solvent for controlling slurry viscosity was added thereto in an appropriate amount, and then was mixed with a stirrer. Thereafter, 7.5 parts by mass of styrene-butadiene rubber (SBR) as a binder was added thereto and then mixed, thereby obtaining a negative electrode active material slurry.

Meanwhile, a copper foil (thickness: 20 μm) was prepared as a negative electrode current collector. Further, the negative electrode active material slurry prepared above was applied to one surface of the negative electrode current collector such that an amount of the active material applied became 10 mg/cm$^2$ to thereby form a coating film. Then, this coating film was dried under vacuum at 80° C. for 60 minutes. Thereafter, the obtained negative electrode was punched using a punch to have a circle shape of φ16 mm, thereby obtaining a test electrode (negative electrode).

COMPARATIVE EXAMPLE 1

92.5 parts by mass of black lead as a negative electrode active material, 5 parts by mass of acetylene black as a conductive aid, and 1.25 parts by mass of carboxymethyl cellulose (CMC) as a binder were mixed with one another. Then, water as a solvent for controlling slurry viscosity was added thereto in an appropriate amount, and then was mixed with a stirrer. Thereafter, 1.25 parts by mass of styrene-butadiene rubber (SBR) as a binder was added thereto and then mixed, thereby obtaining a negative electrode active material slurry.

Meanwhile, a copper foil (thickness: 20 μm) was prepared as a negative electrode current collector. Further, the negative electrode active material slurry prepared above was applied to one surface of the negative electrode current collector such that an amount of the active material applied became 10 mg/cm$^2$ to thereby form a coating film. Then, this coating film was dried under vacuum at 80° C. for 60 minutes. Thereafter, the obtained negative electrode was punched using a punch to have a circle shape of φ16 mm, thereby obtaining a test electrode (negative electrode).

COMPARATIVE EXAMPLE 2

80 parts by mass of black lead as a negative electrode active material, 5 parts by mass of acetylene black as a conductive aid, and 7.5 parts by mass of carboxymethyl cellulose (CMC) as a binder were mixed with one another. Then, water as a solvent for controlling slurry viscosity was added thereto in an appropriate amount, and then was mixed with a stirrer. Thereafter, 7.5 parts by mass of styrene-butadiene rubber (SBR) as a binder was added thereto and then mixed, thereby obtaining a negative electrode active material slurry.

Meanwhile, a copper foil (thickness: 20 μm) was prepared as a negative electrode current collector. Further, the negative electrode active material slurry prepared above was applied to one surface of the negative electrode current collector such that an amount of the active material applied became 10 mg/cm$^2$ to thereby form a coating film. Then, this coating film was dried under vacuum at 80° C. for 60 minutes. Thereafter, the obtained negative electrode was punched using a punch to have a circle shape of φ16 mm, thereby obtaining a test electrode (negative electrode).

<<Evaluation of Internal Resistance of Test Electrode (Negative Electrode)>>: Preparation of Coin-Sized Battery. First, a lithium metal foil (thickness: 500 μm, φ17 mm) as a counter electrode was disposed in an HS cell made of stainless steel (manufactured by Hohsen Corp.), a separator (thickness: 25 μm, φ18 mm) formed by a polypropylene microporous membrane was placed thereon, and any one of the test electrodes (negative electrodes) produced in the Examples and Comparative Examples described above was placed thereon. To a power generating element obtained in this way, 200 μL of a liquid electrolyte of 1M LiPF$_6$/EC+DEC (1:1 (volume ratio)) was injected, a spacer, a spring, and an upper cover were superimposed in this order, and the upper cover was fixed with a wing nut, thereby obtaining a coin-sized battery corresponding to each of the Examples and Comparative Examples.

Figure 5:
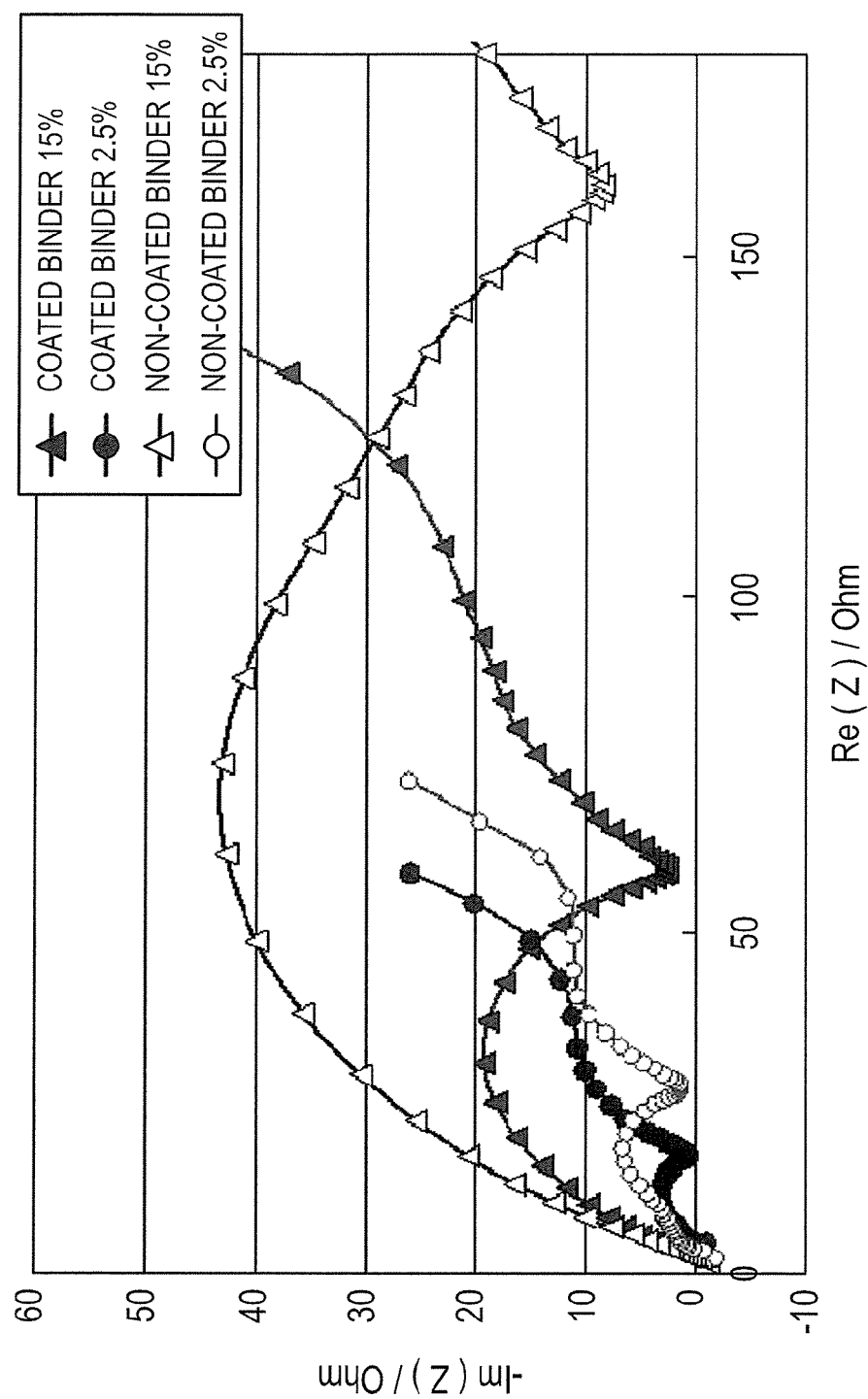

<<Evaluation of Internal Resistance by Alternating Current Impedance Measurement>>:Four coin-sized batteries produced as described above were charged by a constant current at 0.1 C until 5 mV, and then charged by a constant voltage of 5 mV (charge for 15 hours in total). Further, discharge was performed by a constant current at 0.1 C until 2 V. Charge and discharge were performed once under these conditions. Subsequently, the battery voltage was set to 0.2 V and then the alternating current impedance was measured. The results thereof are shown in FIG. 5. Herein, in the graph plotted by the alternating current impedance measurement as shown in FIG. 5, the size of the semicircular portion of the graph is proportionate to the size of the internal resistance of the coin-sized battery. As shown in FIG. 5, it was found that the test electrodes (negative electrodes) according to the embodiment of the present invention can lower the internal resistance of the test electrodes (negative electrodes) even when the amount of the binder contained in the active material layer was small, that is, 2.5 parts by mass (Example 1) or was large, that is, 15 parts by mass (Example 2), as compared to the corresponding Comparative Examples.

In this connection, when the electrode material and the agent for inhibiting an increase in internal resistance according to the present invention are used in a non-aqueous electrolyte secondary battery, it is possible to lower the internal resistance of the battery, and further, it is possible to lead the way to provide a battery with excellent rate characteristics and a high output density. As such, it can be said that the invention of the present application by which a battery with a high output density can be provided based on the technical idea considerably different from the related art has extremely high superiority and is creative.

The invention claimed is:

1. An electrode material for a non-aqueous electrolyte secondary battery used for a non-aqueous electrolyte secondary battery using a liquid electrolyte, a gel polymer electrolyte, or an ionic liquid electrolyte, the electrode material comprising:
    a core part including an electrode active material; and
    a shell part in which a conductive material is included in a base material formed by a gel-forming polymer having a tensile elongation at break of 10% or more in a gel state,
    the gel-forming polymer being a polyurethane resin which is obtained by reaction of a polyisocyanate compound with polyether polyols, polyester polyols, polyester polycarbonate polyols, crystalline or noncrystalline polycarbonate polyols, polybutadiene polyol, or silicone polyol.

2. The electrode material for a non-aqueous electrolyte secondary battery according to claim 1, wherein the polyurethane resin is obtained by reaction of polyethylene glycol and a polyisocyanate compound.

3. The electrode material for a non-aqueous electrolyte secondary battery according to claim 1, wherein the electrode active material is a carbon material.

4. A non-aqueous electrolyte secondary battery electrode obtained by forming an electrode active material layer on a surface of a current collector, the electrode active material layer comprising an electrode material, the electrode material comprising:
    a core part including an electrode active material; and
    a shell part in which a conductive material is included in a base material formed by a gel-forming polymer having a tensile elongation at break of 10% or more in a gel state,
    the gel-forming polymer being a polyurethane resin which is obtained by reaction of a polyisocyanate compound with polyether polyols, polyester polyols, polyester polycarbonate polyols, crystalline or noncrystalline polycarbonate polyols, polybutadiene polyol, or silicone polyol.

5. The non-aqueous electrolyte secondary battery electrode according to claim 4, wherein the electrode active material layer comprises a binder, and the binder is an aqueous binder.

6. The non-aqueous electrolyte secondary battery electrode according to claim 4, wherein the current collector comprises a conductive resin layer formed by a resin having conductivity.

7. A non-aqueous electrolyte secondary battery comprising a power generating element,
    the power generating element comprising:
    the electrode according to claim 4;
    another electrode having a polarity different from that of the electrode; and
    an electrolyte layer interposed between active material layers of these two electrodes.

8. The non-aqueous electrolyte secondary battery according to claim 7, wherein the electrolyte layer comprises a liquid electrolyte, a polymer gel electrolyte, or an ionic liquid electrolyte.

9. The non-aqueous electrolyte secondary battery according to claim 7, wherein the battery is a bipolar type lithium ion secondary battery.

10. A method for producing an electrode material for a non-aqueous electrolyte secondary battery, the method comprising a coating step of coating a core part including an electrode active material with a shell part in which a conductive material is included in a base material formed by a gel-forming polymer having a tensile elongation at break of 10% or more in a gel state, the gel-forming polymer being a polyurethane resin which is obtained by reaction of a polyisocyanate compound with polyether polyols, polyester polyols, polyester polycarbonate polyols, crystalline or noncrystalline polycarbonate polyols, polybutadiene polyol, or silicone polyol.

11. The producing method according to claim 10, further comprising:
    a step of preparing a mixture comprising the base material and the conductive material in advance before the coating step,
    wherein the coating step comprises a step of coating the core part with the mixture.

* * * * *